3,518,676
APPARATUS FOR DIRECTIONAL STABILIZATION OF AN ACOUSTIC BEAM EMITTED FROM A SHIPBORNE ECHO SOUNDING OR SONAR TRANSDUCER
Bjorn Kirknes, Horten, Norway, assignor to Simonsen & Mustad A.S., Horten, Norway
Filed May 2, 1969, Ser. No. 821,285
Claims priority, application Norway, May 2, 1968, 1,698
Int. Cl. G01s 9/66; B63b 45/08
U.S. Cl. 340—5
3 Claims

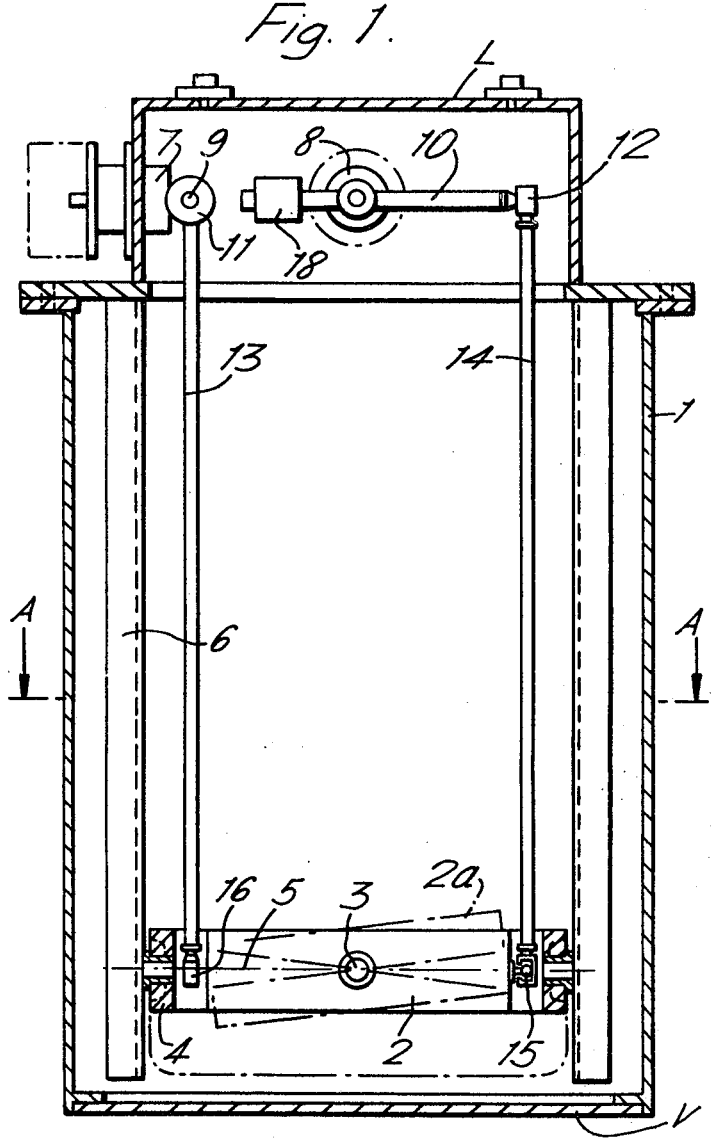

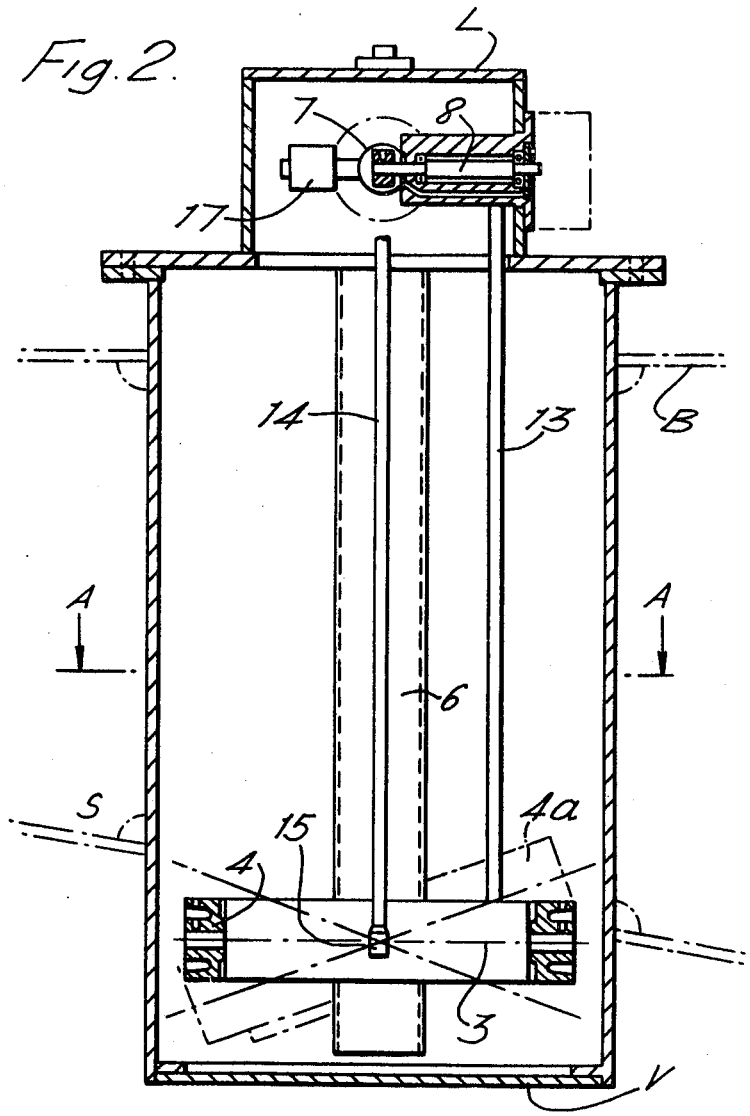

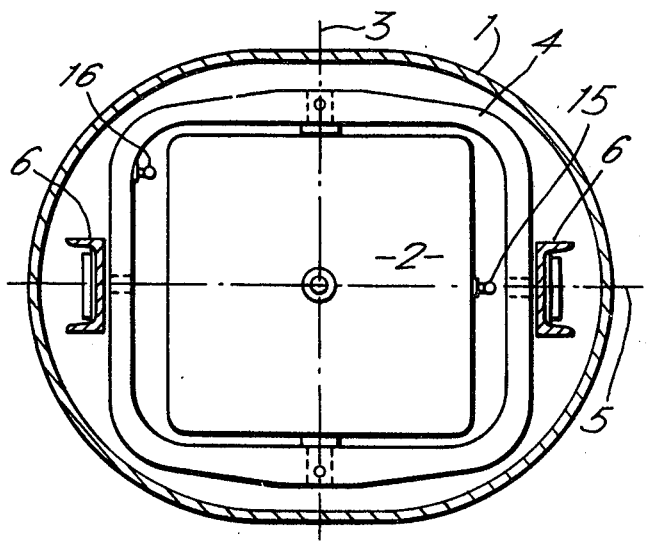

ABSTRACT OF THE DISCLOSURE

To achieve a directional stabilization of the acoustic beam emitted from a shipborne sonar or echo sounding transducer with respect to the pitching and rolling of the ship in the sea, the transducer is mounted in a cardanic suspension inside a liquid filled chamber and below the water line of the ship, the rotation angles about the cardanic suspension axes being controlled by a pair of servo systems localized outside the chamber at a substantial vertical distance from said transducer suspension. For the transfer of relevant torques from the servo systems to said cardanic suspension axes, the output shafts of said systems are linked to the cardanic suspension by means of radial arms and essentially vertical connecting rods.

---

This invention relates to an apparatus for directional stabilization of an acoustic beam emitted from a shipborne echo sounding or sonar transducer, in order that the beam direction is maintained, irrespective of the pitching and rolling of the ship. Such stabilization is particularly useful by oceanographic investigations or for other scientific purposes.

To achieve a stabilization of this kind the transducer may be disposed in a cardanic suspension of the type which is frequently used for compass stabilization onboard ship.

The conditions are, however, more complicated in the present case, as the transducer has to be mounted in water or another liquid to achieve appropriate acoustic matching to the abient seawater. But, due to the damping influence of said liquid, the swinging movements of the transducer will usually not be able to follow the pitching and rolling movements of the ship in the sea, and thus, the latter will not be compensated in an efficient manner in this case. Therefore the compensating swinging movements of the transducer in the cardanic suspension must be driven by outer means capable of submitting sufficient high accelerations and velocities to said cardanic suspension, to achieve the desired stabilization. These outer means will of course have to be operatively controlled in dependence of said pitching and rolling movements.

Thus sensing apparatus must be provided at an appropriate place on board to detect the swinging movements of the ship about its main axes and to submit control signals in dependence of said movements. Preferably, also other sensing devices are provided to detect the instantaneous angular positions of the cardanic suspension and to feed back control position signals for comparison with the former control signals, in order that the difference signals may be utilized for the control of said outer driving means. Thus, for this purpose complete servo systems may be erected.

Thus, the invention more particularly relates to an apparatus for directional stabilization of an acoustic beam emitted from a shipborne echo sounding or sonar transducer, which is disposed in a cardanic suspension in a sealed liquid filled chamber below the water line of the ship, the transducer thus being rotatable about a first axis orientated in relation to the fore-and-aft direction of the ship and a second axis orientated in relation to the athwartship direction, and the angles of rotation about said axes being respectively remotely controlled from associated output shafts of a pair of outer servo systems, situated outside said chamber, in dependence of the pitching and rolling, respectively, of the ship in the sea.

However, for obvious reasons, it will be very disadvantageous to place this servo machinery in water.

It is known to dispose said machinery in a water tight housing essentially at the same level as the cardanic transducer suspension, in order that the relevant torques in an easy way may be transferred to the suspension axes. The transducer is, however, usually mounted below the bottom of the ship, and it is considered rather difficult to arrange water tight shaft packings under these circumstances, which means that such arrangements usually are not consistent with high reliability.

By another known stabilization design the machinery is, for the above reasons, mounted inside the hull of the ship above the transducer suspension, the torque to the suspension axes being transferred by means of a pair of essentially vertical shafts, which each is provided with a pinion engaging a pitch rack linked to the cardanic suspension. This torque transfer device is, however, unnecessarily complex and difficult to maintain, and the coaxially disposed shafts make a water tight seal rather difficult. Such seal is, however, desirable, even when the driving machinery is situated in the ship's hull above the water line, as the transducer is mounted in a liquid filled chamber.

Pinions and racks are generally very sensitive to corrosion, which makes it difficult to avoid back-lash in the gears after a relatively short time of service.

Thus, it is an object of the present invention to provide, reliable, easily maintainable and coincidently simple and rugged transfer devices for the relevant torques under the prevailing conditions.

According to the invention this is achieved by arranging the stabilizing apparatus so that said rotatable output shafts from said pair of servo systems are inserted in essentially mutual perpendicular directions through the walls of said chamber at substantial vertical distances from said cardanic suspension, and are each provided with a radial arm which, by means of a connection rod, is linked to the suspension for torque transfer to the associated said suspension axis.

Here revolving rather than sliding motions are transferred through the water tight chamber walls, as this facilitates the sealing of the chamber.

Preferably each said output shaft is essentially parallel with its associated suspension axis, and the length of each radial arm is made equal to the distance from the associated suspension axis to the connecting point between the associated rod and the cardanic suspension platform, so that each connection rod always will be essentially parallel with the linear distance between the associated output shaft and suspension axis during the motions of the shafts and suspension. Thus, in this case the rotations of the cardanic suspension about each axis taken separately will copy the angular motions of the output shafts, and combined pitch and roll movements of the ship will effect minimal angular errors, whereby angular corrections in the servo systems usually are not required in practice.

The damping influence of the ambient liquid on the transducer movements, will in this case be advantageous in several respects, as unwanted oscillations in the closed loop servo systems will be suppressed, and also violent reaction accelerations, sometimes occurring during pitching in heavy sea, will be damped. Such forceful accelerations may effect mechanical damage in the servo systems or the torque transfer devices.

Therefore according to the invention the liquid filled chamber may suitable to the purpose be subjected to internal superpressure in proportion to the outer water pressure, in order to further increase the liquid damping. Also, under these circumstances corrosive seawater will not be able to penetrate into the chamber in case a minor leakage should occur. Usually the chamber will be filled with oil or another lubricating and inert liquid.

Referring now to the accompanying drawings, a preferred embodiment of the present invention will be described in greater detail, thus disclosing further characteristic features and advantages of apparatus according to the invention.

FIG. 1 shows a symmetric for-and-aft section through the liquid filled chamber.

FIG. 2 shows a corresponding athwartship section through the chamber.

FIG. 3 shows a horizontal section through the chamber along the line A—A in FIGS. 1 and 2.

Each element is provided with the same numerical designation in all figures, and as the figures only represent different views of the same object, references will be made to all figures simultaneously.

The transducer (not shown) is mounted on the bottom of a platform 2 in a liquid filled chamber 1, so that the acoustic beam emitted from the transducer will be directed towards a sealed, acoustically transparent window V, constituting the bottom of the chamber. This window will allow the acoustic vibrations to pass without significant losses and reflections. Thus the emitted beam will be able to propagate through the window and the sea on the outside of the same.

The platform 2 is mounted on a rotatable shaft 3 extending in the fore-and-aft direction, and suspended in a frame 4. This frame is in turn mounted on another rotatable shaft 5, extending perpendicularly to the first shaft 3 and journalled in a rack 6.

A pair of rotatable output shafts 7, 8 from two distinct servo systems, situated outside the chamber, is inserted horizontally and at right angle to each other, through a lid L, sealing the upper end of the chamber 1. These output shafts 7 and 8 are disposed parallelly to the shafts 5 and 3 of the transducer suspension, respectively.

Each output shaft 7, 8 is provided with a radial arm 9, 10. These arms are connected to straight, vertical connection rods 13 and 14, respectively, the rod 13 being linked to the frame 4 to effect a rotation of the same, and the other rod 14 being attached to the platform 2 to effect a rotation of the same in relation to the frame 4.

The connections between the rod 13 and the frame 4, respectively the rod 14 and the platform 2, are constituted by ball-and-socket joints 15, 16. Further the rods 13, 14 and the arms 9, 10 are counterbalanced by counterweights 17, 18. The position of the chamber 1 in relation the the floor-timber B and the bottom S of the ship, is shown in FIG. 2 in dash-and-dot lines. Also the maximum angles of rotation for the platform 2 and the frame 4 are indicated in dash-and-dot lines 2a in FIG. 1 and 4a in FIG. 2, respectively.

I claim:
1. In an apparatus for directional stabilization of an acoustic beam emitted from a shipborne echo sounding or sonar transducer, which is disposed in a cardanic suspension in a sealed liquid filled chamber below the water line of the ship, the transducer being rotatable about a first axis orientated in relation to the fore-and-aft direction of the ship and a second axis orientated in relation to the athwartship direction, and the angles of rotation about said axes being respectively remotely controlled from associated output shafts of a pair of outer servo systems, situated outside said chamber, in dependence of the pitching and rolling, respectively, of the ship in the sea, the improvement consisting of inserting said rotatable output shafts from said pair of servo systems in essentially mutual perpendicular directions through the walls of said chamber at substantial vertical distances from said cardanic suspension and providing each of said rotatable output shafts with a radial arm which is linked by means of a connection rod to the cardanic suspension for torque transfer to the associated said suspension axis.

2. Apparatus as claimed in claim 1, wherein each said output shaft is essentially parallel with its associated axes and each connection rod always is essentially parallel with the linear distance between the associated output shaft and suspension axis.

3. Apparatus as claimed in claim 1, wherein the liquid filled chamber is subjected to superpressure in proportion to the outer water pressure.

References Cited

UNITED STATES PATENTS 2,832,944   4/1958   Kessler _____ 340—8
3,039,078   6/1962   Wilcoxon _____ 340—5

RICHARD A. FARLEY, Primary Examiner

U.S. Cl. X.R.

340—8